United States Patent [19]

Schoenfelder

[11] 4,103,493
[45] Aug. 1, 1978

[54] SOLAR POWER SYSTEM

[75] Inventor: James L. Schoenfelder, Coralville, Iowa

[73] Assignee: Hansen, Lind, Meyer, Iowa City, Iowa

[21] Appl. No.: 556,008

[22] Filed: Mar. 6, 1975

[51] Int. Cl.² ............................ F03G 7/02; F24J 3/02
[52] U.S. Cl. ........................................ 60/641; 60/648; 62/2; 62/467 R; 237/2 B; 126/271
[58] Field of Search ................... 60/641, 648; 126/270, 126/271; 62/2, 236, 238, 467 R; 290/2, 4; 237/12.1, 1 A, 2 B

[56] References Cited

U.S. PATENT DOCUMENTS

| 576,718 | 2/1897 | Bolton | 237/12.1 |
|---|---|---|---|
| 729,390 | 5/1903 | McGonagle | 237/12.1 |
| 1,101,001 | 6/1914 | Willsie | 60/641 |
| 2,111,435 | 3/1938 | Munzinger | 60/693 X |
| 2,221,971 | 11/1940 | Haywood | 62/2 |
| 2,292,927 | 8/1942 | Bunker | 307/149 X |
| 2,342,211 | 2/1944 | Newton | 126/271 X |
| 2,409,159 | 10/1946 | Singleton | 62/467 P |
| 2,693,939 | 11/1954 | Marchant et al. | 126/271 X |
| 2,869,332 | 1/1959 | Keller | 62/238 |
| 2,942,411 | 6/1960 | Hutchings | 126/271 X |
| 2,952,138 | 9/1960 | Russell et al. | 62/238 |
| 2,969,637 | 1/1961 | Roweramp | 126/271 X |
| 3,153,442 | 10/1964 | Silvern | 62/238 X |
| 3,194,026 | 7/1965 | Fleur | 62/238 X |
| 3,250,269 | 5/1966 | Sherock | 126/271 |
| 3,545,222 | 12/1970 | Petranek | 62/236 |
| 3,803,847 | 4/1974 | McAlister | 62/467 X |
| 3,822,692 | 7/1974 | Demarest | 60/641 |
| 3,832,853 | 9/1974 | Butler, Jr. | 60/641 |
| 3,841,302 | 10/1974 | Falbel | 62/2 X |
| 3,902,474 | 9/1975 | Pyle | 126/270 |
| 3,960,322 | 6/1976 | Ruff | 62/2 |
| 4,010,378 | 3/1977 | Tharpe | 60/693 X |

OTHER PUBLICATIONS

Refrigeration & Air Conditioning, Range and Oven Servicing, by Robert Scharff, McGraw-Hill Book Company: 1976, pp. 164–166.

Primary Examiner—Allen M. Ostrager
Attorney, Agent, or Firm—Zarley, McKee, Thomte, Voorhees & Sease

[57] ABSTRACT

A method and apparatus for use of solar energy. The method and apparatus has the advantage and benefit of providing for use of all collected solar energy, whether or not there is an immediate need in the home for heating. Solar energy is also used for cooling a home or existing building structure via utilization of a heat pump system. The apparatus comprises in combination a direct boil solar collector which boils a refrigerant therein, a Rankine cycle engine for converting heat energy transferred to said refrigerant to kinetic energy, a generator, a heat pump system, and means connected to the Rankine cycle to selectively transfer said kinetic energy from the Rankine engine to the generator or the heat pump. Excess energy not utilized for heating or cooling the home system is returned to a utility power grid for a credit for the home owner and immediate redistribution by the utility to other users.

6 Claims, 7 Drawing Figures

SOLAR POWER SYSTEM

BACKGROUND OF THE INVENTION

In recent times much work has been done concerning the development of solar energy heating systems for homes and other like building structures. In such typical systems solar energy is gathered via a solar energy collector which converts the solar energy into heat energy. The heat energy is transferred from the collector to a circulating fluid with the circulated fluid giving up its heat to the interior of the home. While such systems have met with a limited degree of success, one of the problems has been utilization of solar energy collected during times of the year when there is no heating need on the home such as for example certain times of the spring, fall and especially during the summer. The problem is especially difficult during the spring and fall when often times during the day the home has no heating requirement but since the temperature cools rapidly in the evening, there is a heating need during this period of time when no sun energy for conversion into heat energy is available. This disadvantage of solar heating systems has been to a limited degree overcome by utilization of thermal storage systems. In such systems heat is transferred from a warmed collector plate of the solar collector to a heat transfer medium circulated therewithin. The warmed heat transfer medium is pumped away from the collector and to a remotely located thermal storage system. Typically, the thermal storage system is comprised of a storage vessel filled with water or a highly efficient heat transfer material such as Glauber's salt or the like. The warmed circulating heat transfer medium is passed through the storage unit and gives up its heat to the thermal storage system. Thereafter, when the air space of the home or other building structure is at a lower temperature than the thermal storage unit, heat is transferred from the remote position of the thermal storage unit to the interior of the home. In this manner collection and storage of solar energy in the form of heat energy has been utilized in the past. However, such structures utilizing remotely located thermal storage tanks, vessels or the like have certain inherent disadvantages. First, with remotely located storage units there is inherently always some heat loss which of course decreases efficiency of the overall system. Secondly, such remotely located thermal storage systems can only maintain and store heat for a certain defined limited period of time and if the heat is not used during that period of time, it eventually dissipates without any significant advantage to the user. This is especially important when long periods, such as for example two to three weeks, of cloudy weather occurs. Thirdly, the use of remotely located thermal storage systems involves the building of special apparatus, coupled with the necessary duct work, which would not ordinarily be present in the home structure thereby increasing substantially the cost. Fourthly, some of the special equipment needed for the prior art thermal storage systems is unique to solar energy usage and cannot be utilized for any other use within the home heating and cooling system. Fifthly, such prior art thermal storage systems result in loss of valuable floor space coupled with a high cost for storage of the heat. Sixthly, with prior art systems when no heating or cooling is required, the collected solar energy is essentially wasted since it is dissipated to the exterior of the home. This condition unfortunately occurs often during the spring and fall seasons which is exactly when collectors operate most efficiently because of their orientation with respect to the angle of the sun. Thus during the period of the year at which the solar heating system has its greatest potential for most efficient operation, much of the heat gathered is not utilized.

The solar power system of this invention, described in detail below, eliminates each and every one of the above-mentioned disadvantages. First, since no physical heat storage occurs within the solar power system of this invention, it eliminates the high cost of storage and loss of valuable floor space. Secondly, when neither heating or cooling is required, the system will switch to operating electrical home appliance needs and feeding excess generated electricity to a utility power grid for a credit and immediate redistribution by the utility. Thirdly, since the system operates year around, smaller collector areas are needed to achieve the same equivalent energy production as in a thermal storage unit. This results in lower material and installation costs. Fourthly, the solar power system of this invention takes advantage of the highly efficient spring and fall seasons to collect and utilize to the fullest extent solar power generated during those seasons.

Other advantages of the solar power system of this invention are many. For example, compared to most solar thermal storage systems, the solar power system of this invention exhibits an economy of equipment and simplicity of operation. Fewer pieces of equipment utilized results in conservation of energy expended for materials, manufacturing, and installation costs. Also, the solar power system of this invention, and more specifically the direct boil solar collector, hereinafter described, is more efficient than typical water and air collector systems in several ways which will be discussed hereinafter. In the collector of this invention, the solar heat is transferred directly to a refrigerant and immediately used by transfer to kinetic energy via a Rankine cycle engine thereby avoiding the immediate step of transferring heat to storage equipment and then to appropriate power equipment.

Another unique advantage of the solar power system of this invention is that excess solar power not utilized or needed for immediate heating or cooling demand within the home is converted to electrical energy and returned to a utility power grid for a credit. The utility can thereafter immediately redistribute the generated electrical current to other users. Thus the storage is in effect a mere credit storage on paper, balancing the electrical consumption by a home owner against the electrical generation produced by the home owner in his solar power system.

The method of accomplishing these advantages and objects of the invention, as well as others, will become apparent from the detailed description of the invention provided hereinafter.

SUMMARY OF THE INVENTION

This invention relates to a unique solar power system, a process for operating that solar power system, and to a unique direct boil solar collector especially designed for use in the solar power system presented herein.

In the solar power system, a direct boil solar collector is utilized for gathering solar energy and converting this solar energy to heat energy via transfer of heat energy from the solar collector to a refrigerant circulated within the solar collector. The refrigerant is boiled by the heat generated from the solar collector and conveyed away to operate a Rankine cycle engine to convert the heat energy to kinetic energy. Kinetic energy from the Rankine cycle engine can be selectively transferred to a generator for generating electricity or to a heat pump system with the heat pump system providing capability of operating in either a heating mode or a cooling mode for the home. In addition, heat generated by the Rankine cycle engine is utilized for additional heating within the home.

The process of the invention involves converting solar energy to heat energy, using a portion of the heat energy to heat an existing structure, converting the remainder of said heat energy, if any, to electrical energy, using a portion of the electrical energy for the needs of said existing building structure, and returning the remainder of said electrical energy, if any, to a utility power grid for a credit for the home owner and immediate redistribution by the utility to other electrical energy consumers needing the electricity.

The direct boil collector of this invention is constructed of two transparent members separated by an air space. These in turn are separated by an air space from a dark metal collector which absorbs a large portion of incoming solar radiation. Immediately behind and touching the metal collector is a finned tube configuration in which the refrigerant circulates. Immediately behind the metal collector and finned tube is an insulating member which forms a cavity between the metal collector and the insulating member. This cavity is filled with dark sand which maximizes the heat transfer to the refrigerant within the finned tubes by storing sensible heat in the collector. Storage in this manner prevents short cycling caused by intermittent cloud cover. Other dense materials, other than sand, having high specific heat values could also be utilized in place of the sand.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a schematic illustration of the solar power system of this invention during operation when the home requires no heating or cooling demand, such condition being typical of spring, early summer and early fall.

DETAILED DESCRIPTION OF THE INVENTION

Figure 2:
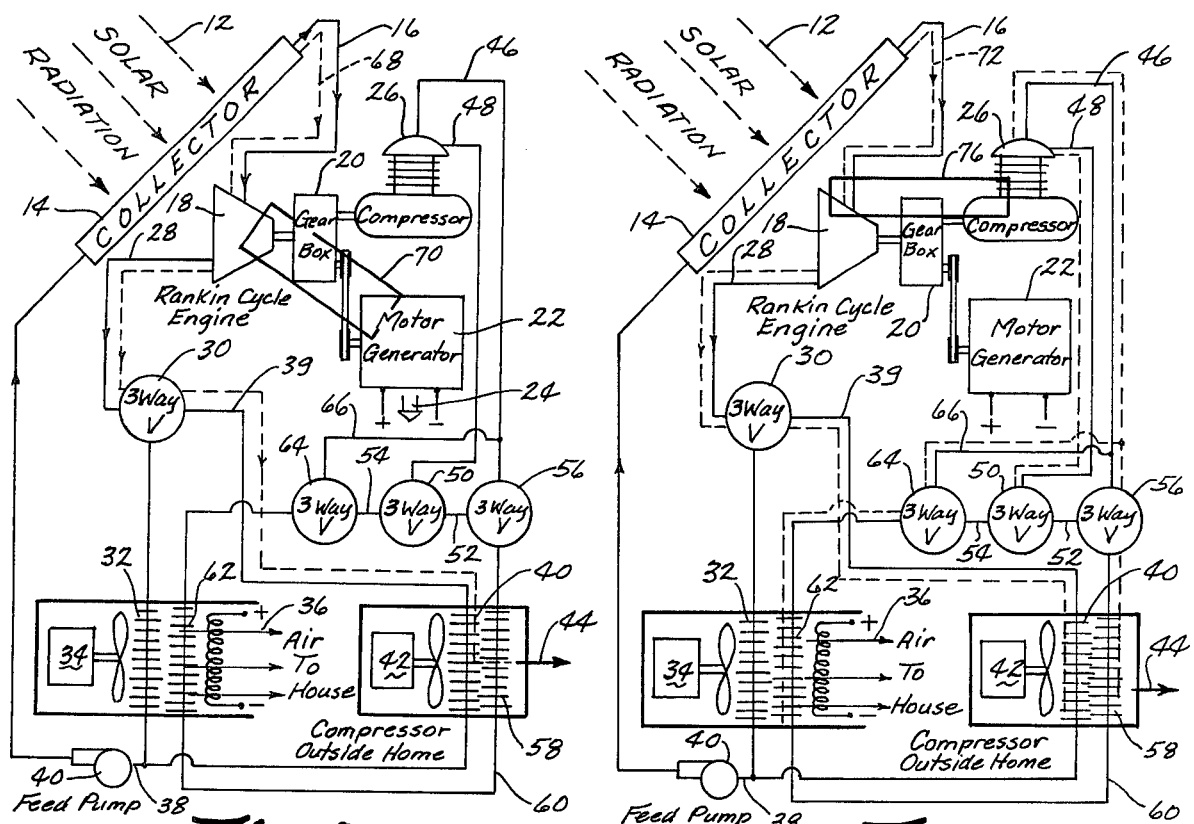
FIG. 2 is another schematic illustration of the solar power system of this invention as it would operate when the home has a cooling requirement, typical of summer time operation.

The solar power system of this invention comprises generally a direct boil solar collector for gathering solar energy and converting the solar energy to heat energy and transfer of the heat energy to a refrigerant which is boiled by the transfer of heat energy. The boiled refrigerant is circulated to a Rankine cycle engine, sometimes referred to as an expander engine, wherein it is converted into kinetic energy in the form of rotary motion. The kinetic energy, that is the rotary motion of the Rankine cycle engine, can be selectively transferred to a generator for generating electrical current or to a heat pump system. While never heretofore utilized in a system combination as described in this invention, both a Rankine cycle engine and a heat pump are well known and will therefore not be described in detail herein, except as they specifically relate to this invention. For furthere details with regard to the operation of a Rankine cycle engine see Baumeister, Theodore; "Marks' Standard Handbook for Mechanical Engineers"; 7th ed.; New York; Industrial Press, Inc.; cc 1967; 4/58–4/59, which is incorporated herein by reference. For further details with regard to the operation of a heat pump, see the description of a heat pump in Strock, Clifford and Koral, Richard L.; "Handbook of Air Conditioning, Heating and Ventilating"; 2nd ed.; New York; Industrial Press, Inc.; cc 1965, pages 4/11–4/13 which are incorporated herein by reference. As will be explained hereinafter, the term heat pump refers to a compression type refrigerating system consisting of an evaporator, a condenser, a compressor and an expansion valve. Such will be described with relationship with the drawings hereinafter.

Before describing in detail the system and process of the invention, it should be readily understood that the drawings presented herein are schematic flow charts only. Thus the direct boil solar collector, as is apparent to those skilled in the art, would be positioned within a home on either a south or south southeast or south southwest facing wall or alternatively on a south or southeast or south southwest facing roof panel of the home for collection and gathering of solar energy. The Rankine cycle engine and the necessary plumbing circuitry therefor as well as the heat pump system, the generator, and the conventional air cooling and heating system of the home would be spaced within the internal building structure as they presently are in conventional operation. Since the exact location of these specific elements of applicant's system will depend upon the position and nature of the building structure employed, and are all within the skill of one in the art, it is not felt necessary to provide a specific drawing showing positioning of these elements within a building structure. The operation of applicant's invention will now be described.

With continuing reference to FIG. 1, solar radiation 12 hits direct boil solar collector 14. Direct boil solar collector 14 will hereinafter be described in detail with regard to its operation. However, for the moment it is sufficient to know that direct boil solar collector 14 has a collector plate with finned tubes welded thereon. Circulated through the fin tubes of the direct boil solar collector 14 is a refrigerant liquid which is capable of being boiled at temperatures normally reached in solar collectors. No critically exists with regard to the precise refrigerant utilized in the direct boil solar collector 14 of this invention and any of the conventional halocarbon refrigerants which pick up heat by evaporating at low temperature and pressure and give up heat on condensing at higher temperature and pressure can be employed. However, refrigerants which operate in the temperature range of conventional flat plate collectors, i.e., at a temperature of from 180° Fahrenheit to 220° Fahrenheit and at a condenser temperature of from 70° Fahrenheit to 110° Fahrenheit are preferred. Suitable examples include dichloromonoflouromethane, monochloromonofluoromethane, dichlorotetraflouroethane, monochlorodiflouromethane, and other suitable refrigerants selected from the group of halocarbons compounds, cyclic organic compounds, aseotropic mixtures thereof, and unsaturated organic compounds such as dichlorodiflouroethylene, monochlorotripflouroethylene and the like. Other suitable refrigerants can be found in Strock, Clifford and Koral, Richard L.; "Handbook of Air Conditioning, Heating and Ventilating:" 2nd ed.; New York; Industrial Press, Inc.; cc 1965 at page 4/14 and 4/15 which is incorporated herein by reference.

The refrigerant in direct boil solar collector 14 is boiled by solar radiation hitting the collector plate of the direct boil solar collector. Hot refrigerant vapor typically at temperatures of from 180° F. to 200° F. leaves direct boil solar collector 14 via conduit 16. Conduit 16 conveys the boiled refrigerant from direct boil solar collector 14 to the Rankine cycle engine 18. Rankine cycle engine 18 is of typical construction of a Rankine cycle or expander engine which utilizes a high temperature, vaporized gas, to convert heat energy to kinetic energy in the form of rotary motion. The refrigerant vapor which is conveyed into the Rankine cycle engine 18 via line 16 is expanded through the Rankine cycle engine 18 where a portion of the heat added to the refrigerant in the direct boil solar collector 14 is converted to kinetic energy as heretofore explained. This kinetic energy in the form of rotary motion is then used to perform the desired work.

As shown in FIG. 1, the kinetic energy generated in Rankine cycle engine 18 can be transferred selectively via transmission 20 to either generator 22 wherein it will produce electric current, depicted by arrow 24 or to compressor 26 of the heat pump system.

Figure 5:
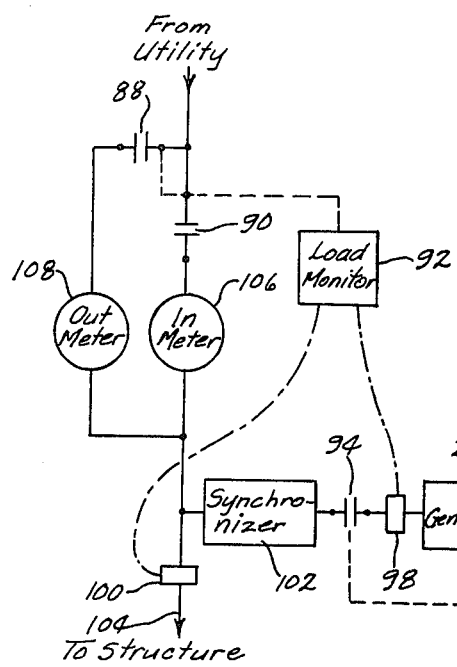
FIG. 5 is a schematic of one type of circuitry which can be utilized for measuring the electrical consumption of the solar power system of this invention and the electrical generation of the solar power system of this invention for proper balancing of the two and returning to the home owner or other consumer any electrical credit for excess generated electrical current.

As can be seen, where the kinetic energy generated by the Rankine cycle engine 18 is transferred via transmission 20 to genertor 22, electrical current 24 will be generated. Electrical current 24 can be utilized to supply the existing electrical needs of the home or other building structure. In addition, any excess electrical current not utilized for the needs of the existing home or building structure can be returned via the schematic for metering circuitry as shown in FIG. 5 to a utility power grid. This will be described in more detail hereinafter. But as can be seen this allows the possibility of direct use of solar energy whether or not the home is in need of heat at any given moment. Thus by conversion to electrical energy, the solar energy can be utilized for the electrical needs of the home and to the extent that excess electricity is generated it can be redistributed back to an electrical utility. In other words, storage of solar energy is effectively accomplished by a paper credit to the home owner for excess generated electrical current beyond the needs of the home. Thus since there is no actual physical storage of heat within the solar power system of this invention, it eliminates the high cost of such physical storage, the loss of valuable floor space, and importantly it eliminates the inherent heat losses which always occur in physical heat storage elements.

As previously mentioned, the Rankine cycle engine 18 is operatively connected via transmission 20 to compressor 26. The operation of compressor 26 and the heat pump system will hereinafter be described.

The vaporized refrigerant, boiled by solar radiation 12 hitting direct boil solar collector 14 which has passed via line or conduit 16 through the Rankine cycle engine 18, leaves the Rankine cycle as a saturated vapor at a slightly lower temperature and presure via line 28. Positioned on line, or conduit 28, the two terms being utilized interchangeably herein, is a three-way diverting valve 30. Three-way valve 30 is an automatic control valve which senses an electrical impulse and opens or closes different refrigerant flow paths depending upon whether heat is needed or is not needed in the home structure. Such valves are known and are of conventional construction, and a general description of the same can be found in "Automatic Controls for Commercial Heating, Ventilating and Air Conditioning"; Honeywell; Section B; FIG. 5 - page 11, which is incorporated herein by reference.

When heat is needed in the home structure valve 30 is open to allow the heated vaporized refrigerant which has passed through Rankine cycle engine 18 and left via conduit 28 to pass from valve 30 into heat exchanger 32. Heat exchanger 32 is of conventional construction and is operable to transfer the remaining heat from vaporized refrigerant to the heat exchanger 32. That heat is then blown by a conventional forced air blower, schematically depicted at 34 via the home heating duct system into the interior of the home as represented by directional arrow 36.

After exiting the heating exchanger 32 the now-cooled and liquid refrigerant enters line 38, passes through feed pump 40 and is recirculated through direct boil solar collector 14, line 16, Rankine cycle engine 18, exit conduit 28 of the Rankine cycle engine, three-way automatic control valve 30, and heat exchanger 32 with the cycle continuing as long as three-way valve 30 is positioned to direct the refrigerant through heat exchanger 32. Thus one unique advantage of the process of applicant's invention is that even when electrical energy is being generated by converting the heat energy to kinetic energy in a Rankine cycle and utilizing that kinetic energy for conversion to electric energy in a generator, additional heat is being supplied to the interior of the home or other building structure by passing the saturated refrigerant vapor leaving the Rankine cycle engine through a heat exchange system and blowing the hot air into the interior of the home.

Where the home requires no added heat, valve 30 will sense this and close off the flow through heat exchanger 32 and the exiting refrigerant vapors from Rankine cycle engine 18 will pass through three-way valve 30 and be directed through line 39 to condenser or heat exchanger 40 of like construction to heat exchanger 32.

Heat exchanger or condenser 40 is a condensing coil installed in a unit exterior to the home. In heat exchanger or condenser 40, the refrigerant is condensed, gives up its remaining heat, and is circulated back into a feed line 38 for pump 40. Forced air blower 42 dissipates the hot air stream caused by heat exchange in condenser 40 to the exterior of the home when the additional heat is not needed as shown by directional arrow 44.

Thus as can be seen depending upon the position of three-way valve 30, the remaining heat from the refrigerant after it exits from the Rankine cycle engine 18 can either enter the forced air heating system of the home where heat supply is needed or can be rejected to the exterior of the home where heat supply is not needed.

As previously mentioned, the Rankine cycle engine can selectively run either generator 22 or compressor 26.

A description will now be given of the alternative modes of operation when the compressor 26 is selectively operated by the kinetic energy of the Rankine cycle engine. Compressor 26 forms a part of the heat pump system of the power system of this invention.

Compressor 26 can be run by the kinetic energy power from Rankine cycle engine 18 via selective transfer thereto from transmission 20. Alternatively in times when the solar radiation is insufficient, compressor 26 can be run by reversing generator 22 and supplying electrical current thereto making generator 22 operate as a motor and transferring the rotary motion power of the motor 22, again via transmission 20, to compressor 26.

Refrigerant of like description to that previously given, preferably dichlorodiflouromethane or monochlorodiflouromethane, enters compressor 26 through conduit 46. In compressor 26 the refrigerant entering through conduit 46 as a vapor is significantly compressed and therefore subjected to greater pressure which in turn increases its heat value. The pressurized, vaporized refrigerant leaves compressor 26 via exit conduit 48. Positioned on exit conduit 48 is a three-way diverting auto control valve of like configuration to valve 30, which is designated herein as valve 50. Valve 50 can direct the flow of compressed refrigerant into conduit 52 or conduit 54, depending upon whether the heat pump system is operating in a heating mode or a cooling mode. Where the heat pump system is operating in a cooling mode, compressed refrigerant 50 is directed through line 52, three-way valve 56, and through heat exchanger or condenser 58, wherein refrigerant is condensed, and the heat dissipated to the exterior of the home via forced air blower 42 as indicated by directional arrow 44. From condenser 58, the cooled and condensed refrigerant travels via conduit 60 through condenser or heat exchanger 62 wherein heat from the home is taken on and cool air is blown into the home, from heat exchanger 62 through three-way valve 64, conduit 66 where it flows back into conduit 46 for return to the compressor.

Where the heat pump system is operating in a heating mode a different flow patterns occurs. Cool air is drawn in from the outside and passed through condenser 58 wherein heat exchange occurs with the refrigerant which is directed through three-way valve 56 into line 46, through compressor 26, out of compressor via conduit 48 to three-way valve 50, through line 54, valve 64, wherein the compressed hot vaporized refrigerant passes through heat exchanger 62 wherein heat exchange occurs and forced air blower 34 blows the warmed air into the interior of the home as indicated by directional arrow 36. The refrigerant exits via line 60 again passes through heat exchanger 58 and follows the same path previously discussed with the effect of a net heat gain for the interior space of the home or other building structure.

Thus as can be seen from the above description, the solar power system of this invention can be operated in a variety of different manners to provide home heating exclusively, or where sufficient solar energy is available to generate all of the required home heating need and have excess solar energy, to also provide electrical energy with energy being stored as a credit with a utility company, or alternatively, can be utilized to provide home cooling, and where the cooling capacity is not at maximum, also generate electrical current for storage and credit or alternatively to provide only home cooling. In addition, the system, in times of lack of any solar energy can be utilized by reversing the generator 22 and operating it as a motor for selective generation of either heat or cooling within the heat pump system. The energy utilized during this period of time can be offset against previously stored and credited energy with the utility company. Examples of these various modes of operation will now be given.

FIG. 2 shows a typical operation of the solar power system of this invention when solar energy is readily available and there is a required cooling demand, such as typical of summer time operation. Solar energy converted to kinetic energy by the Rankine cycle is all utilized to operate the compressor 26 in a cooling mode. The path of heat is shown by the dotted line 72, and the power chain by block 76.

Figures 3, 4:
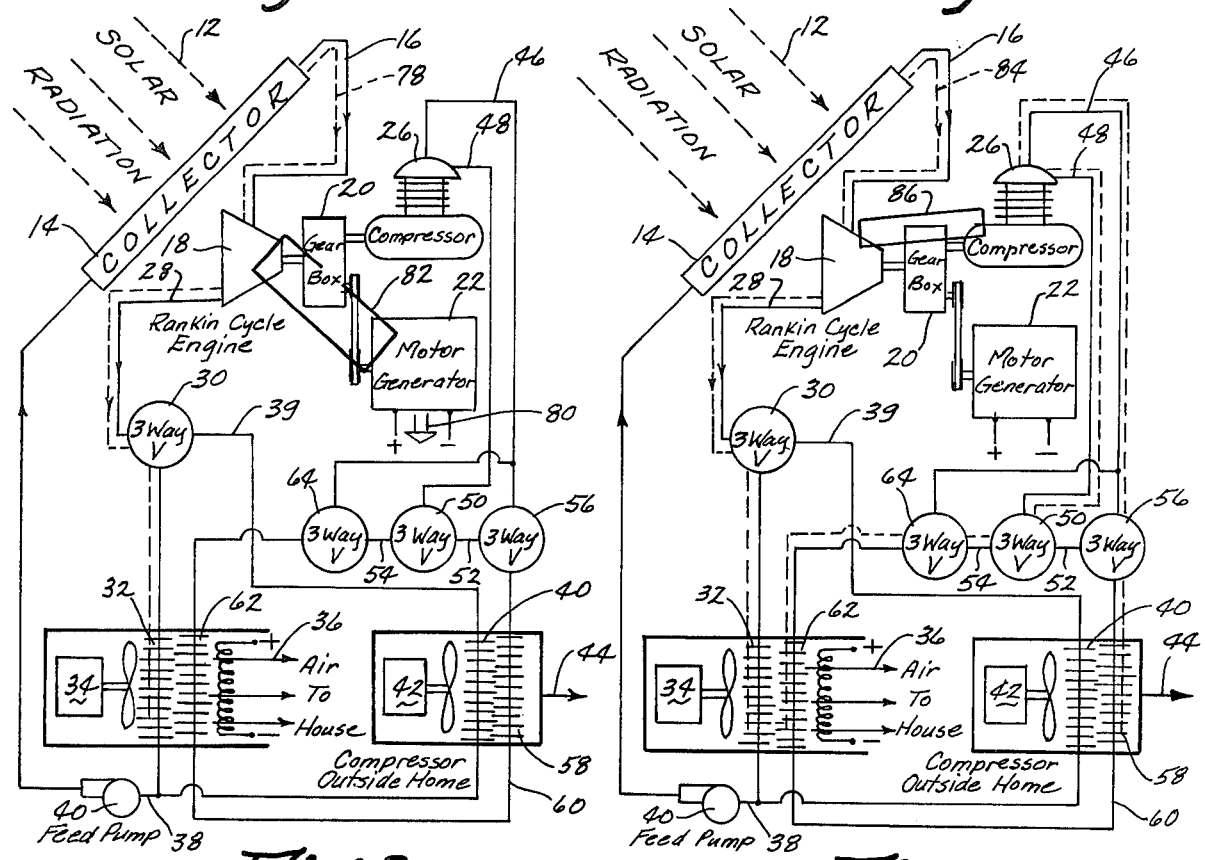
FIG. 3 is another schematic illustration of the solar power system of this invention shown when the home has a heat demand which is less than the solar energy collected and transferred to heat within the home system and therefore shows generation of electrical current for storage and/or credit. This is typical of certain spring, fall and early summer weather.
FIG. 4 is another schematic illustration showing the operation of the solar power system of this invention when the entire needs of the solar energy are utilized for home heating.

FIG. 3 shows a typical condition which might exist in fall, or spring, wherein a minimal heat demand is present such that solar radiation can readily supply the heat demand and generate excess electrical current. Dotted line 78 shows the path of heat, directional arrow 80 the flow of generated electrical current and block 82 the power chain.

FIG. 4 shows a mode of operation wherein a great heat demand is required. Thus all solar radiation is utilized for heating and the heat pump system as well. As can be seen in FIG. 4 all of the available energy is utilized for home heating, there is no generated electrical current available for credit. The heat flow is shown by dotted line 84, and the power chain by power block 86.

As can be seen from the description of the alternative embodiments presented above, with regard to the mode of operation shown in FIG. 1 and FIG. 3, there is generation of excess electrical current, because the solar energy is greater than either the demand for heating and cooling. As heretofore previously mentioned, one of the advantages of this invention is that such excess energy is not wasted but is converted into usable electrical energy. That electrical energy is utilized, to the extent necessary, by the home or other building structure's electrical system and to the extent that excess amounts beyond the requirements of the home are generated is fed back to a utility power grid system for immediate redistribution elsewhere. Thus storage of the energy is via an electrical credit with the utility company. Of course, the power fed back into the utility grid must be synchronized with the utility power system. This is already conventionally done with existing generator systems which operate in parallel with utility power systems. And a like synchronization would occur here. Power that is sent to the utility power grid is credited to the home owner simply by installing two meters. One meter registers only incoming electricity and the other registers outgoing current from generator 22. The meters are read in a manner consistent with current meter reading with the exception that the outgoing meter quantity is subtracted from the incoming meter quantity to determine the owner's net energy consumption. FIG. 5 illustrates one method of circuitry for accomplishing this result. Contacts 88 and 90 are opened or closed by load monitor 92. Contact 94 is opened or closed by electrical impulse sensor 96. Electrical impulse sensors 98 and 100 are connected to load monitor 92. When the generator starts, sensor 96 closes contact 94 and sends an electrical current to the synchronizer 102 which allows the home generated electricity to parallel the utility grid electricity. After synchronization, electricity enters the main 104. Electrical impulse sensors 98 and 100 sense the current in each line and sends signals back to the load monitor 92. Load monitor 92 compares the signals from sensors 98 and 100 and if the current in sensor 100 is greater than the current load in sensor 98, load monitor 92 opens contact 88 and closes contact 90. Electricity flows through the in meter 106. If the current in sensor 98 is greater than the current of sensor 100, load monitor 92 closes contact 88 and opens contact 90 and excess electricity passes through out meter 108 recording the proper credit for generated electrical current.

Figure 6:
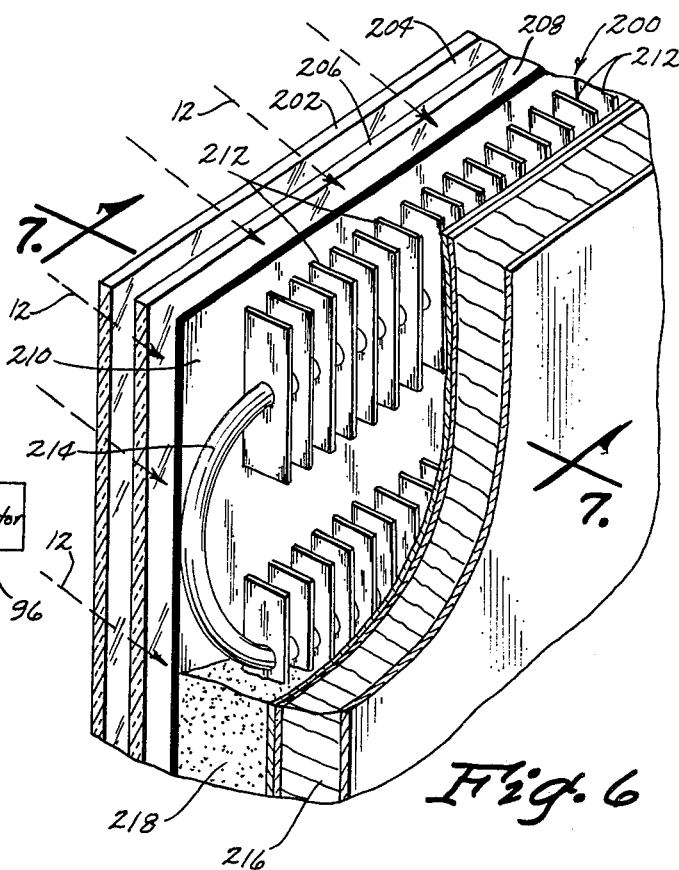
FIG. 6 is a perspective view of the direct boil solar collector utilized in this invention.
Figure 7:
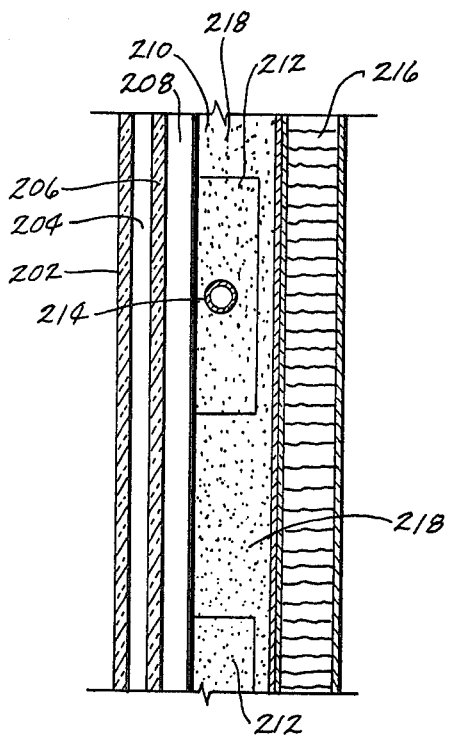
FIG. 7 is a sectional view along line 7—7 of FIG. 6 of the direct boil collector of this invention.

As heretofore mentioned, this invention also relates to a direct boil solar collector of unique construction peculiarly adaptable to utilization in the solar power system of this invention. FIG. 6 shows a perspective view of the direct boil solar collector. A sectional view along line 7—7 of FIG. 6 is shown in FIG. 7. In FIGS. 6 and 7 there is shown a solar collector generally designated 200 which is comprised of a most exteriorly exposed transparent member, preferably made of glass, 202, with an air space 204 immediately therebehind. Spaced apart from and behind the most exteriorly exposed transparent member 202 and immediately behind air space 204 is an interiorly disposed transparent member 206. An additional air space 208 is positioned immediately behind interiorly disposed glass member 206. Of course, the number of glass members and air spaces can be varied as desired. However, it is preferred that at least two glass members, an exterior glass member and interior glass member be utilized with an intervening air space in order to prevent reradiation of significant amounts of solar energy away from the unit. Behind interiorly disposed air space 208 is the collector plate 210. Collector plate 210 is comprised of a highly efficient heat transfer material and can be a metal such as copper, tin or alloys of metal such as steel and the like. Traditionally, the collectors are painted a dark absorbing color. Immediately behind and touching the collector 210 is a finned tube configuration. The finned tube configuration is comprised of a plurality of small spaced apart fins 212 attached to a circulating fluid conduit 214. It is important for purposes of greatest efficiency of heat transfer in the direct boil collector of this invention that the fins actually touch collector plate 210. This assures that heat energy will be transferred to the fins and the tube and of course the refrigerant which is circulating therethrough.

Immediately behind and spaced apart from the tube 214 and fins 212 is an insulating panel 216 constructed of conventional insulating materials such as styrofoam, sawdust or the like. The cavity formed between the back of collector 210 and the front of insulating panel 216 is filled with a dense material of high specific heat value. It is preferred that the material be sand. However, other material such as coal, limestone and the like in fine granular quality can also be used. Preferably the material is dark in color.

The purpose of the insulating panel 216 is to reduce heat loss from the back of the collector plate 210. Insulating panel 216 will also serve as the enclosure which keeps the fine granular material of high specific heat 218 within the cavity of the direct boil solar collector.

The purpose of the high specific heat granular material filling the cavity previously mentioned herein is to store sensible heat in the collector. Storage in this manner prevents short cycling caused by intermittent cloud cover. Heat stored in this manner also extends the operating time of the Rankine cycle engine 18 since the stored heat will allow the refrigerant within tubes 214 having fins 212 to be boiled for a defined period of time even after the sun has disappeared.

The liquid refrigerant enters the finned tubing of the collector and solar radiation heats and boils the refrigerant. Hot refrigerant vapor leaves the collector via line or conduit 16 of FIG. 1 to travel to the entrance to the Rankine cycle engine 18. Thus the collector of this invention provides for direct boiling of a refrigerant liquid which is essential to the operation of the process of this invention. The fins 212 and the tube 214 having direct contact with collector plate 210 insure a rapid and efficient heat transfer to the refrigerant traveling within tube 214.

Thus as can be seen, the power system of this invention, the method of operation of the invention, and the direct boil solar collector all provide a solar use system which has many unique advantages. Some of those advantages are the following:

This system does not physically store heat but rather returns it to a utility for a "paper credit" and storage; this sytem provides a capability for producing electricity and heating without operation of the rest of the system; the system of the invention provides using heat generated by Rankine cycle engine for home heating; this system operates and produces useful energy whenever the sun shines no matter what the needs of existing building structure are; the simplicity of the system is apparent in that small amounts of equipment will be utilized to perform many different heating, cooling and electrical generating functions; this system eliminates the cost and space required for physical thermal storage; since this system is operating continually during periods of sunshine, it produces more useful heat per given unit of collector per operating season than conventional thermal storage systems; all available solar energy is utilized to either produce heat, for electrical uses, for cooling, or for storage as electrical credit; in the spring and fall collectors operate most efficiently and the power system of this invention maximizes the efficiency of those seasons. Thus as can be seen, the invention accomplishes all of the stated objects.

What is claimed is:

1. A solar system comprising,
   a direct boil solar collector for gathering solar energy, converting said solar energy to heat energy, and transfer of said heat energy to a refrigerant within said collector, and vaporizing said refrigerant;
   a Rankine cycle engine for converting heat energy transferred to said refrigerant to kinetic energy, said Rankine cycle engine being fluidly and sealingly in communication with said refrigerant and said direct boil solar collector via a Rankine cycle entrance line and a Rankine cycle exit line,
a first three-way diverting valve positioned on said Rankine cycle exit line being in fluid and sealing communication with a first heat exchange means, for heat exchange with an air space,
said first heat exchange means having an exit line in fluid and sealing communication with said direct boil solar collector,
said first three-way diverting value also being in communication with a second heat exchange means, for heat exchange with a second air space,
said second heat exchange means having an exit line in fluid and sealing communication with said direct boil solar collector, a generator;
a heat pump system; and
means connected to said Rankine cycle engine to selectively transfer said kinetic energy from said Rankine cycle engine to said generator or said heat pump system, whereby in times of solar energy generation said solar energy may be used for heating or cooling said first air space via said heat pumps system and the heated refrigerant passing through said Rankine cycle exit line or alternatively for generating electrical current.

2. The solar power system of claim 1 wherein said first heat exchange means has an associated fan means for circulating warmed air away from said first heat exchanger.

3. The solar power system of claim 1 wherein said exit lines from said first and second heat exchangers, which are both in fluid and sealing communication with said direct boil solar collector, have a feed pump positioned thereon for pumping said refrigerant to said direct boil solar collector.

4. The solar power system of claim 1 wherein said heat pump system comprises,
a compressor operatively secured to said means for selective transfer of said kinetic energy from said Rankine cycle engine to said generator or said heat pump system,
said compressor having a refrigerant entrance line and a refrigerant exit line fluidly and sealingly in communication therewith,
said refrigerant exit line having a second three-way diverting valve positioned thereon for selective direction of said compressed refrigerant to a third three-way diverting valve or a fourth three-way diverting valve,
said third three-way diverting valve being in communication with a third heat exchanger, and the refrigerant entrance line of said compressor,
said fourth three-way diverting valve being in communication said second three-way diverting valve and the refrigerant entrance line of said compressor.

5. The solar power system of claim 4 wherein said second and fourth three-way diverting valves are both in communication with a fourth heat exchanger, which in turn communicates with the refrigerant entrance line of said compressor.

6. The solar power system of claim 5 wherein said third heat exchange means has an associated fan means for moving warmed air away from said third heat exchanger.

* * * * *